(12) United States Patent
Cotteverte et al.

(10) Patent No.: US 6,821,903 B2
(45) Date of Patent: Nov. 23, 2004

(54) METHOD FOR MAKING AN INTEGRATED OPTICAL CIRCUIT

(75) Inventors: Jean-Charles J. C. Cotteverte, Avon (FR); Fernando Dias-Costa, Lieusaint (FR); Christophe F. P. Renvaze, Avon (FR); Dusan Nedeljkovic, Sauix-les-Chartreux (FR)

(73) Assignee: Corning Incorported, Corning, NY (US)

( * ) Notice: Subject to any disclaimer, the term of this patent is extended or adjusted under 35 U.S.C. 154(b) by 561 days.

(21) Appl. No.: 09/729,882

(22) Filed: Dec. 5, 2000

(65) Prior Publication Data

US 2002/0074307 A1 Jun. 20, 2002

(30) Foreign Application Priority Data

Dec. 17, 1999 (EP) .............................. 99403188

(51) Int. Cl.[7] .............................. H01L 21/20
(52) U.S. Cl. ................. 438/706; 438/710; 438/719; 438/725
(58) Field of Search ................. 438/710, 719, 438/706, 725

(56) References Cited

U.S. PATENT DOCUMENTS 5,049,978 A * 9/1991 Bates et al. .................... 357/74
6,097,871 A * 8/2000 De Dobbelaere ........... 385/129
6,370,307 B1 * 4/2002 Bruce et al. ................. 385/130

FOREIGN PATENT DOCUMENTS

WO          WO 94 16345 A        7/1994

OTHER PUBLICATIONS

Berger, V.,et al.; "*Photonic Band Gaps and Holography*"; Journal of Applied Physics, US, American Institute of Physics; vol. 82, No. 1; Jul. 1, 1997.

Berger, V., et al.; "*Fabrication of a 2D Photonic Bandgap by a Holographic Method*"; Electronics Letters, GB, IEE Stevenage; vol. 33, No. 5; Feb. 27, 1997.

* cited by examiner

*Primary Examiner*—Robert Kunemund
(74) *Attorney, Agent, or Firm*—Walter M. Douglas

(57) ABSTRACT

In order to manufacture an integrated optical circuit, a first mask is formed on a first region of a substrate and defines the shape of at least one optical device (such as a waveguide). A second mask is formed on a second region of the substrate and corresponds to an optical structure (such as a periodic array structure or photonic crystal) to be formed in a second region of the substrate distinct from the first region. The first mask and the second mask are each made of a material which substantially resists a predetermined etching gas. The second mask may formed, patterned, and etched without adversely affecting the characteristics of the first mask.

24 Claims, 8 Drawing Sheets

METHOD FOR MAKING AN INTEGRATED OPTICAL CIRCUIT

BACKGROUND OF THE INVENTION

1. Field of the Invention

The present invention generally pertains to integrated optical circuits, and particularly to a method for manufacturing an integrated optical circuit.

2. Technical Background

Integrated optical circuits are usually constituted by optical and/or optoelectronic devices formed on a substrate. The optical and/or optoelectronic devices may be active devices (such as resonators, lasers, detectors, switches, etc.) or passive devices (such as waveguides, filters, couplers, etc.)

An interesting feature of integrated optical circuits resides in their compactness. However, these circuits experience optical losses as light propagates from one device to another on the substrate.

Light between the optical devices of an integrated circuit propagates through waveguides. Conventionally, waveguides are composed of a continuous structure made of a material having a higher refractive index than the surrounding substrate. Light propagates inside the waveguide by virtue of internal reflections off the faces thereof. Introduction of light into the waveguide is carried out so that the angle of reflection off the internal faces of the waveguide, as light propagates, is smaller than a critical angle depending on the refractive indices inside and outside the waveguide. This angle requirement may generally be fulfilled when the waveguide is in the form of a straight line. However, when the waveguide is bent (bent portions are needed in integrated circuits in order to reduce their size), optical losses occur due to the fact that the reflection angle at the faces of the waveguide is too large, which gives rise to refractive waves.

One technique for reducing optical losses in integrated optical circuits, using a photonic crystal, consists in providing, around optical devices, a dielectric periodic structure which creates a frequency band gap. A frequency band gap is a range of frequencies (or photonic energy) at which propagation through the periodic structure is impossible. The parameters of the dielectric periodic structure, such as the period length, the refractive index of the structure, the shape of the periodic lattice, etc., are calculated so that the frequency of the light propagating inside the waveguides that interconnect the various optical circuits on the substrate is within the frequency band gap. Thus light remains confined inside the optical circuits and waveguides since it cannot radiate outside these optical devices, in the dielectric periodic structure.

FIG. 1 illustrates an example of such an integrated optical circuit. For the purpose of simplification, the integrated optical circuit of FIG. 1 essentially consists of a waveguide 1 surrounded by a dielectric periodic structure 2. The waveguide 1 receives light on one lateral side thereof as shown by arrow 3. Light propagates inside the waveguide to emerge from the other lateral side as shown by arrow 4.

The integrated circuit comprises a substrate 5 coated with a dielectric layer 6 having a higher refractive index than the substrate 5. The dielectric periodic structure 2 is arranged along the longitudinal sides of the waveguide 1. The structure 2 typically consists of an array of holes 2a formed throughout the layer 6 and substrate 5, perpendicularly to the longitudinal axis of the waveguide 1, but, as a variant, may also consist of an array of rods. The waveguide 1 is defined by the central portion of the dielectric layer 6 bounded by the periodic structure 2. Horizontal radiation of light out of the longitudinal sides of the waveguide 1 is prevented by the periodic structure 2, which reflects, according to a diffraction phenomenon, optical waves having frequencies within the corresponding band gap. Light is further vertically confined within the waveguide by virtue of the fact that the refractive index of the waveguide is higher than that of the substrate 5 and that of air. Alternatively, it is also possible to provide a three-dimensional dielectric periodic structure around the waveguide, instead of the two-dimensional structure as illustrated in FIG. 1, in order to confine the light within the waveguide both horizontally and vertically.

SUMMARY OF THE INVENTION

The present invention provides a reliable method for manufacturing an integrated optical circuit in which an optical device, such as a waveguide, a resonator, etc., is associated with an optical structure, such as an array structure defining a frequency band gap region. Both the optical device and the optical structure may be formed with great accuracy.

The method generally comprises the steps of: forming a first mask on a face of a substrate, the first mask defining a pattern corresponding to at least one optical device to be formed in a first region of the substrate; forming a second mask on the face of the substrate, the second mask defining a pattern corresponding to an optical structure to be formed in a second region of the substrate, distinct from the first region; and etching the substrate having thereon the first and second masks, in order to form the at least one optical device and the optical structure in the substrate.

By virtue of the simultaneous use of the first and second masks, each one corresponding to a region of the substrate, it becomes possible to form the optical device(s) and the optical structure(s) on the substrate in a simple manner and with great accuracy.

A reason for this is that the two masks may be formed separately and, therefore, two respective specific patterning methods may be applied to form the two masks. In other words, the patterning technique used to form the second mask, corresponding to the second region of the substrate, may be different from that used to form the first mask, corresponding to the first region of the substrate.

This is particularly important, especially in the context of photonic crystals, when it is desired to manufacture integrated optical circuits having one or more optical devices, such as waveguides, couplers, etc., and an array structure defining a photonic band gap proximate to the optical device(s). Indeed, in such a case, the optical device(s) and the array structure have quite different shapes. The array structure to be formed in the substrate is periodic or quasi periodic, with a period which may be small, in the order of 250–500 nm. The construction of this periodic structure requires a specific technique suitable for forming a mask with small irregularities, such as holes, disposed according to a periodic lattice. A typical such technique may consist of interference or holographic lithography, which uses two interfering laser beams irradiating the wafer. Interference lithography however is not appropriate for forming a mask corresponding to the optical devices (waveguides, resonators, couplers . . . ), because these devices generally do not consist of a periodic or quasi periodic structure. A conventional lithography technique employing UV (ultraviolet) exposure will, on the contrary, enable such a mask to be satisfactorily formed. Thus, the present invention makes it possible to select, for each of the first and second regions of the substrate, a specific appropriate patterning technique for forming the corresponding mask.

By contrast, using a single mask for both the optical device(s) and the optical structure would require, in many cases, a complicated lithography method for producing the mask, namely a method which would be adapted to all kinds of shape contained in the pattern to be created in the substrate. The known UV or electron beam exposure lithography techniques, although suitable for producing masks corresponding to optical devices such as waveguides, lasers, etc., cannot offer, for the time being, a sufficient accuracy for forming frequency band gap structures.

Another advantage of the present invention resides in that the two masks are used simultaneously, so as to form the optical device(s) and the optical structure together. The present invention thus provides a simple process, requiring only one etching step for the substrate.

Preferably, the method according to the invention further comprises the step of removing the first and second masks.

The step of etching the substrate may consist of a dry etching step using a predetermined etching gas, for example a fluorine-bearing gas such as $SF_6$. In this case, the first and second masks are each made of a material which substantially resists the predetermined etching gas.

Preferably, in order to simplify the manufacturing method, the step of forming the first mask and the step of forming the second mask are carried out in such a manner that one of the first and second masks overlays the other. There is then no need to define two separate zones where, respectively, the first and second masks have to be formed, since one of the two masks may overlay the other. In practice, one of the first and second masks has a first portion which overlays the other mask and a second portion which is in direct contact with the substrate.

According to the invention, one of the first and second masks may be formed using an interference lithography technique, whereas the other may be formed using a UV exposure technique.

Advantageously, the second mask is formed by carrying out an interference lithography technique, and the first mask is made of a material which is substantially insensitive to the radiation used in the interference lithography technique, so that the second mask may be formed after the formation of the first mask without affecting the first mask.

The step of forming the second mask may then comprise the steps of: forming a photoresist layer on the face of the substrate supporting the first mask, and forming the pattern corresponding to the optical structure in the photoresist layer using the interference lithography technique.

According to a first embodiment of the present invention, the first and second masks are respectively made of metal and a photoresist material. The metal may typically consist of at least one of the following metals: nickel, chromium and gold.

According to this first embodiment, the step of forming the first mask comprises the steps of: forming a first layer on the substrate, the first layer being made of a material which is substantially insensitive to light; forming a photoresist layer on the first layer; patterning the photoresist layer using a UV exposure technique, so as to obtain a photoresist pattern corresponding to the first region of the substrate; etching the first layer using the photoresist pattern as a mask; and removing the photoresist pattern.

The above-mentioned step of etching the first layer may consist of a wet etching step.

According to a second embodiment of the present invention, the first and second masks are both made of a photoresist material, the first mask being however constituted by a photoresist material which has been heated in order to remove its sensitivity to light.

According to this second embodiment, the step of forming the first mask comprises the following steps: forming a photoresist layer on the substrate; patterning the photoresist layer using a UV exposure technique, so as to obtain a pattern corresponding to the first region of the substrate; and heating the photoresist pattern in order to remove its sensitivity to light.

According to a third embodiment of the present invention, the first mask is formed using a UV exposure technique, and the second mask is made of a material which is substantially insensitive to UV, so that the first mask may be formed after the formation of the second mask without affecting the second mask.

In this third embodiment, the step of forming the second mask comprises the steps of: forming a first layer on the substrate, the first layer being made of the material which is substantially insensitive to UV; forming a photoresist layer on the first layer; patterning the photoresist layer using an interference lithography technique, so as to obtain a photoresist pattern corresponding to the second region of the substrate; etching the first layer using the photoresist pattern as a mask; and removing the remaining photoresist pattern.

The step of forming the first mask then comprises the steps of: forming a photoresist layer on the second mask, and forming the pattern corresponding to the at least one optical device in the photoresist layer using the UV exposure technique.

The substrate used in the three embodiments above is preferably a silicon on insulator substrate.

The optical structure formed in the substrate typically consists of an array structure proximate to the optical device. In practice, the integrated optical circuit as obtained by the method according to the invention may comprise a waveguide, as the optical device, and an array structure having a frequency bandgap, as the optical structure. The array structure may take the form of a periodic array of holes or a periodic array of rods.

DETAILED DESCRIPTION OF PREFERRED EMBODIMENTS

Figure 1:
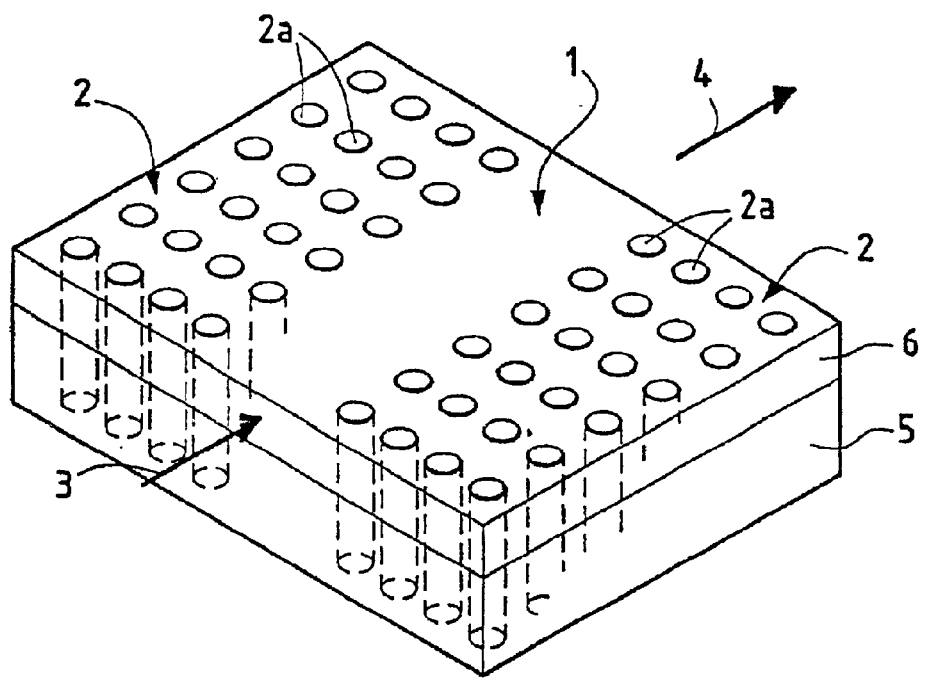
FIG. 1 is a perspective view showing a known integrated optical circuit.

FIGS. 2A to 2J diagrammatically show a method for manufacturing an integrated optical circuit according to a first embodiment of the invention. For the purpose of simplification, the method illustrated in FIGS. 2A to 2J is directed to the manufacture of a waveguide surrounded by an array structure. However, optical devices other than waveguides may be produced by the method according to this first embodiment.

At a first step (FIG. 2A), a metal layer 8 and a photoresist layer 9 are successively formed on a substrate 7. The substrate 7 is preferably a silicon on insulator (SOI) substrate, i.e. a substrate composed of a silicon base substrate 7a, coated with a thin silica layer 7b which in turn is coated with a thin silicon layer 7c. The silicon layer 7c has a higher refractive index than the silica layer 7b, for reasons which will be explained below. The metal constituting the layer 8 may consist, for example, of nickel, chromium or gold.

Figure 2A:
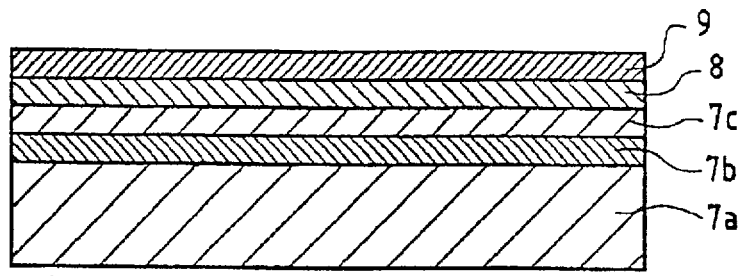
FIGS. 2A to 2J are section views diagrammatically showing a method for manufacturing an integrated optical circuit according to a first embodiment of the present invention.
Figure 2B:
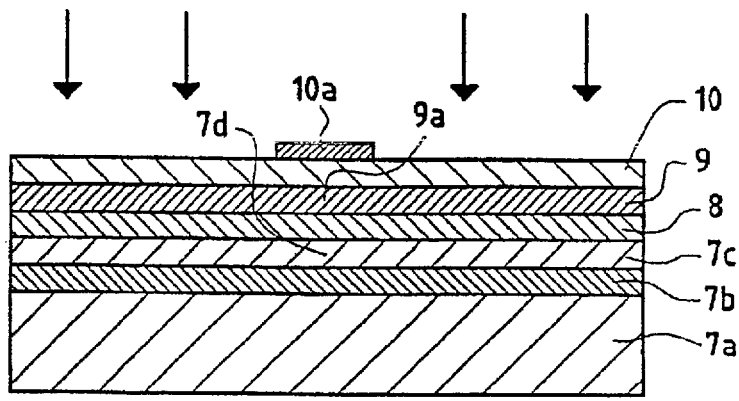
Figure 2C:
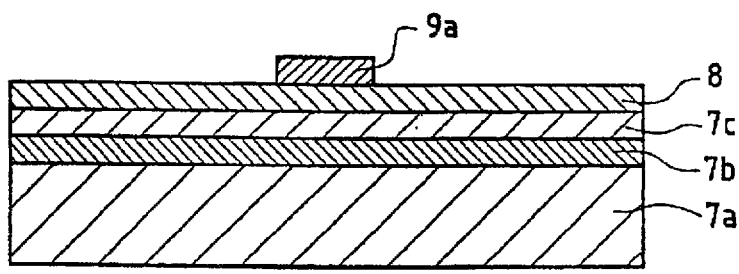
Figure 2D:
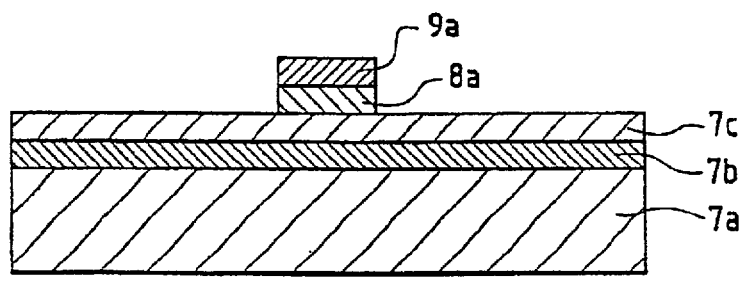

At a second step (FIG. 2B), a silica mask 10 is applied onto the photoresist layer 9, in a manner known to the skilled person. The silica mask 10 supports, on a portion of its upper surface, a chromium pattern 10a taking the shape of the optical waveguide to be formed in the substrate 7, namely, in the embodiment as illustrated in FIG. 2B, the shape of a strip. The chromium pattern 10a is located on the upper surface of the silica mask 10 so as to face a region 7d of the silicon layer 7c where the optical waveguide is to be formed. The wafer 7, 8, 9 as shown in FIG. 2B is then exposed to UV radiation through the silica mask 10. The portions of the silica mask 10 which are not covered by the chromium pattern 10a are transparent to UV. The chromium pattern 10a, on the contrary, reflects UV light and therefore prevents a region 9a of the photoresist layer 9 situated below the pattern 10a to be exposed.

At a third step (FIG. 2C), the silica mask 10 is removed and the photoresist 9 is developed. Development of the photoresist 9 results in removal of the portions thereof which have been exposed to UV light. At the end of the third step, only a portion 9a of the photoresist layer 9, having the same shape as the chromium pattern 10a and the optical waveguide to be formed, remains on the metal layer 8.

Figure 2E:
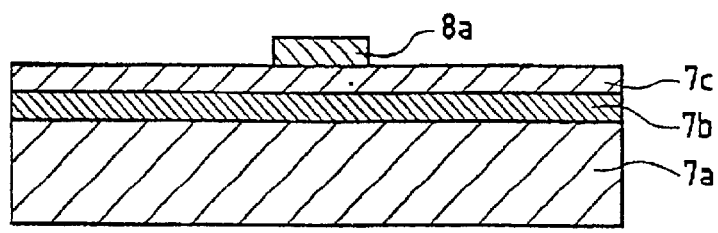
Figure 2F:
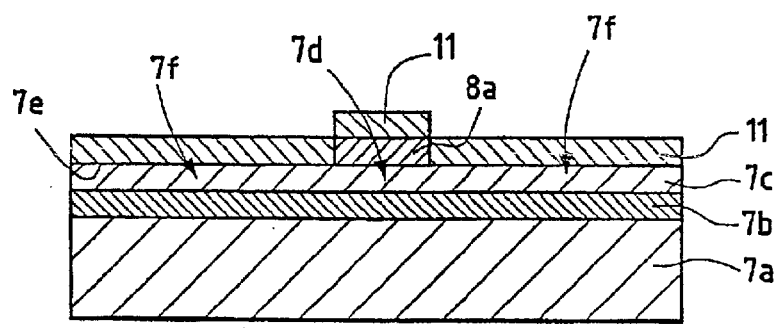
Figure 2G:
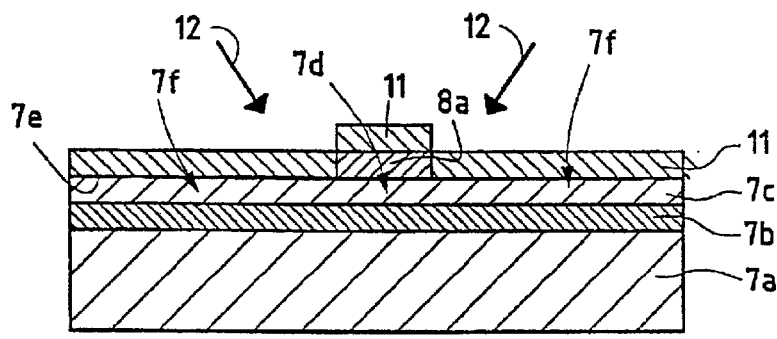
Figure 2H:
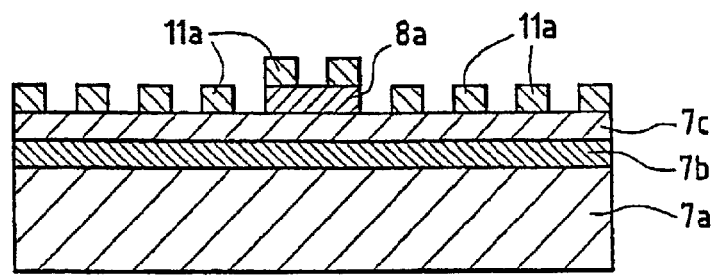
Figure 2I:
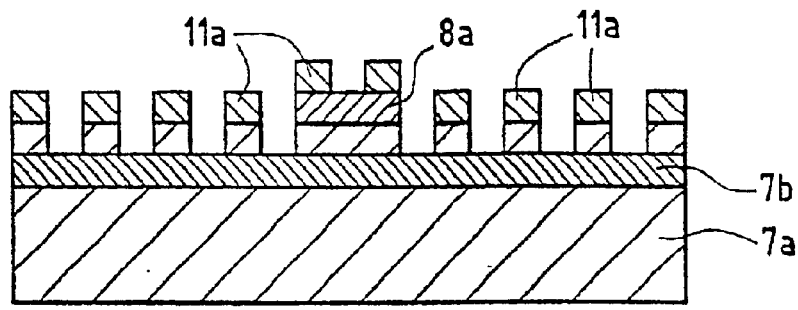

At a fourth step (FIG. 2D), the metal layer 8 is wet etched, using the photoresist portion 9a as a mask, thereby forming a metal pattern or mask 8a on the substrate 7. Wet etching of the metal layer 8 is carried out by means of an appropriate acid capable of attacking the metal while leaving the photoresist mask 9a substantially unaffected. Examples of such an acid may be the commercially available Gold-Etch (registered trade mark) acid, when the metal is gold, and Nickel-Etch (registered trade mark) acid, when the metal is nickel. The photoresist mask 9a is then removed using a solvent (FIG. 2E).

At a fifth step (FIG. 2F), a photoresist layer 11 is formed on the substrate 7 and the metal mask 8a, so that the metal mask 8a is sandwiched between the thin silicon layer 7c of the substrate and the photoresist layer 11. More specifically, a portion of the layer 11 directly covers the upper face 7e of the substrate while another portion covers the metal mask 8a which is formed on the upper face 7e. The portion of the layer 11 which is in direct contact with the face 7e corresponds to a region of the substrate 7, denoted by reference numeral 7f in FIG. 2F, where the array structure is to be formed.

At a sixth step (FIG. 2G), two interfering laser beams 12 are directed towards the wafer to expose the photoresist layer 11 to a light interference pattern. The interfering laser beams 12 are arranged in such a manner that, after development of the photoresist layer 11 (FIG. 2H), the latter defines a pattern 11a in the form of a periodic array of holes. Due to the fact that the mask 8a is made of a material, i.e. metal, which is substantially insensitive to light, the formation of the pattern 11a may be carried out without affecting the mask 8a. Thus, at the end of the sixth step, the substrate 7 supports a first mask 8a and a second mask 11a, which are respectively associated with the regions 7d and 7f of the substrate 7 where the waveguide and the array structure are to be formed. The two masks 8a, 11a are made of different materials, i.e. metal for the first mask and photoresist for the second mask. Both of these materials are able to resist the dry etching step that is described below.

At a seventh step (FIG. 2I), the substrate 7, and more particularly the silicon layer 7c, is dry etched. To this effect, the wafer 7, 8a, 11a is placed in a plasma chamber containing a process gas, and a plasma is generated inside the chamber from the process gas. The plasma includes reactive species which are able to selectively etch the silicon layer 7c, i.e. without eroding the first and second masks 8a, 11a. Typically, the process gas may contain a fluorine-bearing etching gas such as $SF_6$.

At an eight step (FIGS. 2J), the first and second masks 8a, 11a are removed by appropriate solvents. The integrated optical circuit as obtained is constituted by the silicon base substrate 7a, the silica layer 7b, a waveguide 12 and a periodic array of holes 13. The periodic array of holes 13 has a frequency band gap which prevents horizontal radiation of light from the inside to the outside of the waveguide 12. Light propagating inside the waveguide 12 is further confined vertically by virtue of the fact 20 that the waveguide exhibits a higher refractive index than the silica layer 7b. The integrated optical circuit as diagrammatically shown in FIG. 2J, in section view, is represented in perspective in FIG. 3.

Figure 3:
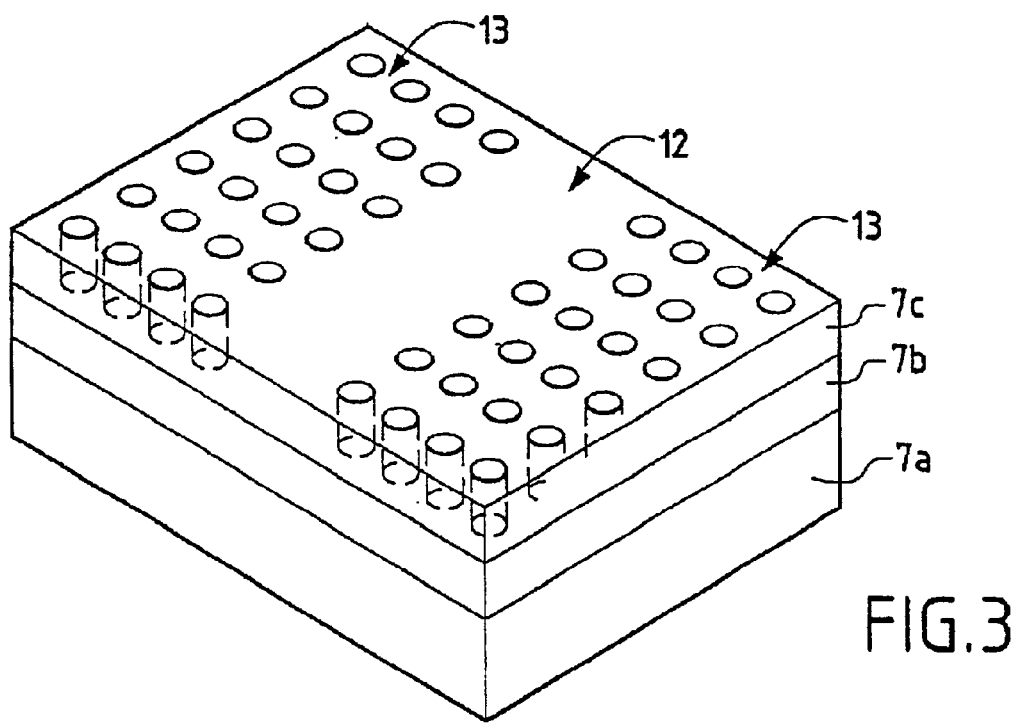
FIG. 3 is a perspective view showing an integrated optical circuit with an array of holes obtained by the method according to the first embodiment of the invention.
Figure 2J:
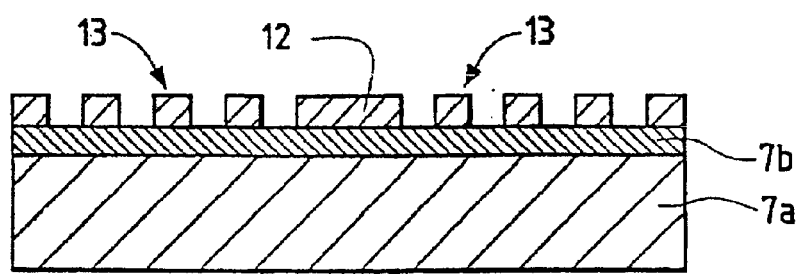
Figure 4:
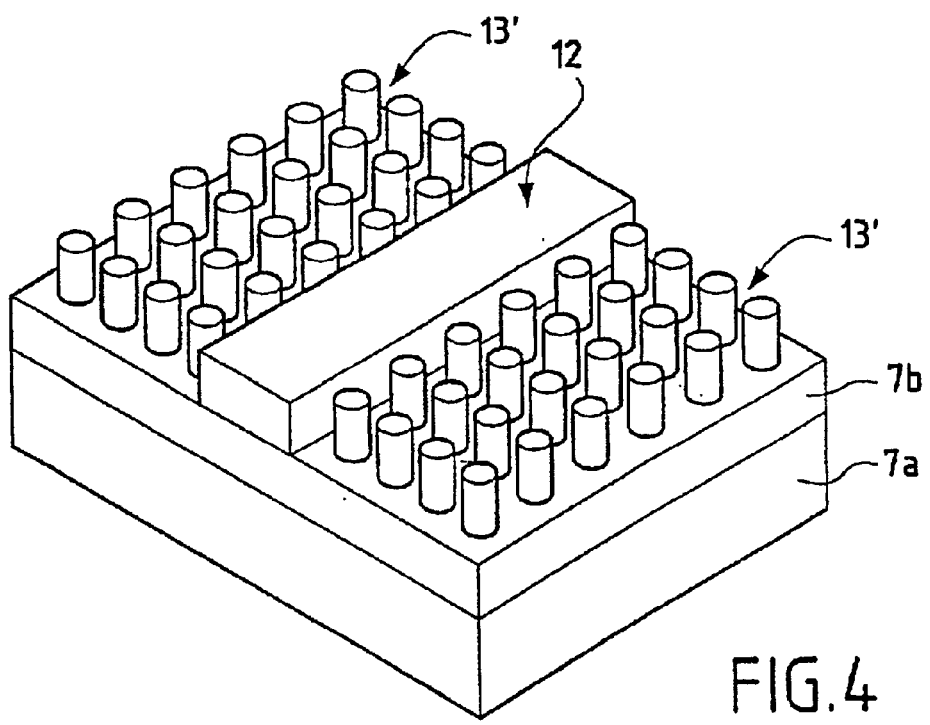
FIG. 4 is a perspective view showing an integrated optical circuit with an array of rods obtained by the method according to the first embodiment of the invention.
Figure 5A:
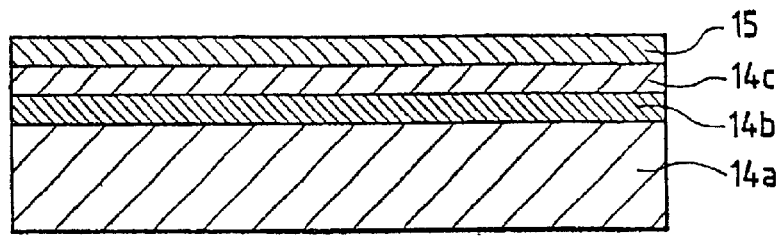
FIGS. 5A to 5H are section views diagrammatically showing a method for manufacturing an integrated optical circuit according to a second embodiment of the present invention.
Figure 5B:
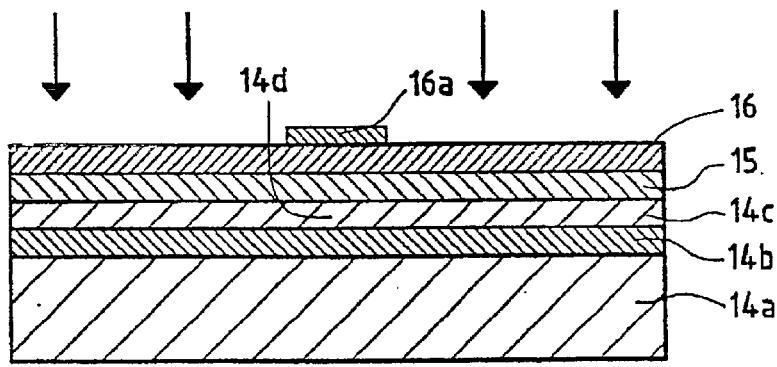
Figure 5C:
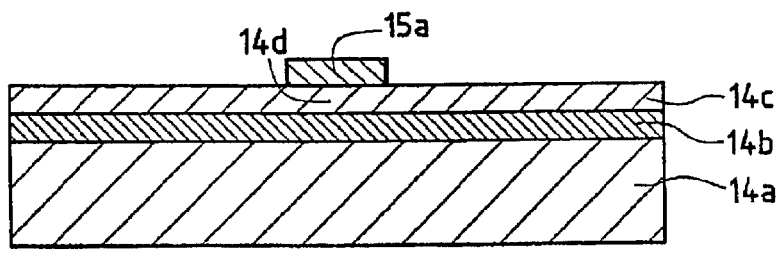
Figure 5D:
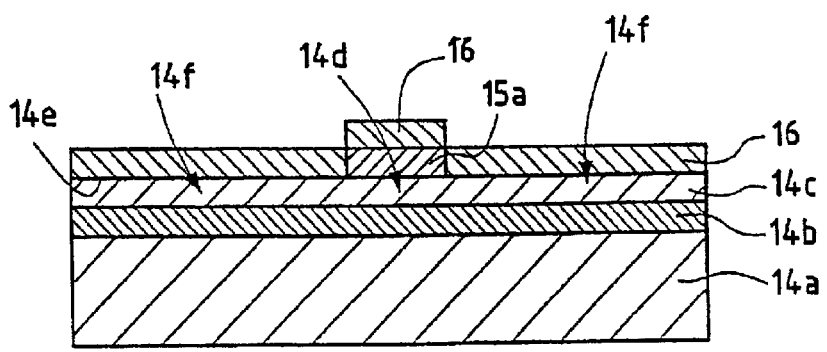
Figure 5E:
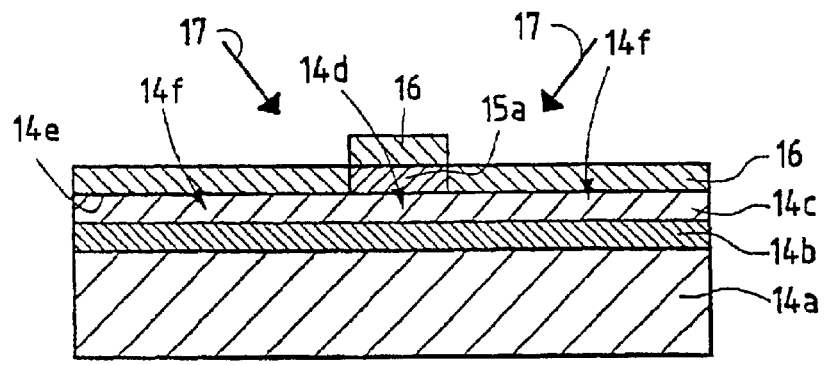
Figure 5F:
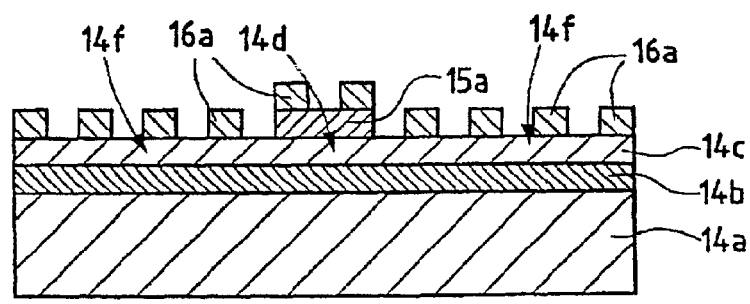
Figure 5G:
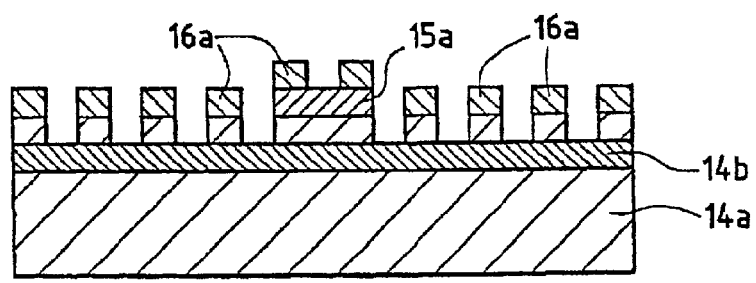
Figure 5H:
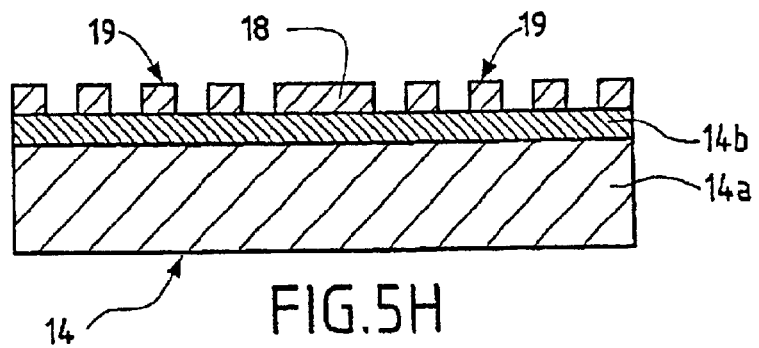

As a variant to the integrated optical circuit as illustrated in FIGS. 2J and 3, the circuit obtained by the method according to the present invention may have an array structure which consists of a periodic array of rods, instead of holes. FIG. 4 shows such an alternative result. In FIG. 4, the same elements as in FIGS. 2J and 3 are designated by the same reference numerals. Thus, the integrated optical circuit of FIG. 4 comprises a base substrate 7a, a silica layer 7b, a waveguide 12 and a periodic array of rods 13' formed in the silicon layer 7c. With respect to the integrated circuit as shown in FIGS. 2J and 3, the circuit of FIG. 4 may be achieved by merely executing the dry etching step (seventh step above) for a longer time.

FIGS. 5A to 5H diagrammatically show a method for manufacturing an integrated optical circuit according to a second embodiment of the invention. For the purpose of simplification, the method illustrated in FIGS. 5A to 5H is directed to the manufacture of a waveguide surrounded by an array structure. However, optical devices other than waveguides may be produced by the method according to this second embodiment.

At a first step (FIG. 5A), a photoresist layer 15 is formed on a substrate 14. The substrate 14 is preferably a silicon on insulator (SOI) substrate, i.e. a substrate composed of a silicon base substrate 14a, coated with a thin silica layer 14b which in turn is coated with a thin silicon layer 14c. The thin silicon layer 14c has a higher refractive index than the thin silica layer 14b, for the same reasons as in the first embodiment.

At a second step (FIG. 5B), a silica mask 16 bearing a chromium pattern 16a is laid on the photoresist layer 15. The chromium pattern 16a is located on the upper surface of the silica mask 16 so as to face a region 14d of the silicon layer 14c where the optical waveguide is to be formed. Then the wafer 14, 15 is exposed to UV radiation through the mask 16, in the same manner as in the second step of the first embodiment.

At a third step (FIG. 5C), the silica mask 16 is removed and the photoresist layer 15 is developed. The result thereof is the removal of all the portions of the layer 15 which were exposed to UV radiation during the second step. At the end of this third step, only the portion of the photoresist layer 15 located below the chromium pattern 16a remains on the substrate 14, thus defining a photoresist pattern 1Sa on the substrate. The photoresist pattern 15a faces the region 14d of the silicon layer 14c where the optical waveguide is to be formed.

At a fourth step (not shown), the photoresist pattern 15a is heated in order to remove, or at least greatly reduce, its sensitivity to light. This step is carried out by placing the wafer 14, 15a into a furnace, and by baking it at about 180° C. for approximately half an hour. The photoresist pattern 15a obtained after this fourth step will be referred to hereinafter as "first mask 15a".

At a fifth step (FIG. 5D), another photoresist layer 16 is deposited on the substrate 14 and the first mask 15a, so that the first mask 15a be sandwiched between the thin silicon layer 14c of the substrate and the photoresist layer 16. More specifically, a portion of the layer 16 directly covers the upper face 14e of the substrate while another portion covers the first mask 15a which is formed on the upper face 14e. The portion of the layer 16 which is in direct contact with the face 14e corresponds to a region of the substrate 14, denoted by reference number 14f in FIG. 5D, where the array structure is to be formed.

At a sixth step (FIG. 5E), two interfering laser beams 17 are directed towards the wafer to expose the photoresist layer 16 to a light interference pattern. The interfering laser beams 17 are arranged in such a manner that, after development of the photoresist layer 16 (FIG. 5F), the latter defines a pattern 16a in the form of a periodic array of holes. Due to the fact that the first mask 15a was made insensitive to light at the fourth step, the formation of the pattern 16a may be carried out without affecting the first mask 15a. Thus, at the end of the sixth step, the substrate 14 supports the first mask 15a and a second mask 16a, which are respectively associated with the regions 14d and 14f of the substrate 14 where the waveguide and the array structure are to be formed. Both of the first and second masks are made of a material which is able to resist the dry etching step that is described below.

At a seventh step (FIG. 5G), the substrate 14, and more particularly the thin silicon layer 14c, is dry etched. To this effect, the wafer 14, 15a, 16a is placed in a plasma chamber containing a process gas, and a plasma is generated inside the chamber from the process gas. The plasma includes reactive species which are able to selectively etch the silicon layer 14c, i.e. without eroding the first and second masks 15a, 16a. Typically, the process gas may contain a sulphur-bearing etching gas such as $SF_6$.

At an eighth step (FIG. 5H), the first and second masks 15a, 16a are removed by appropriate solvents. The integrated optical circuit as obtained is constituted by the silicon base substrate 14a, the silica layer 14b, a waveguide 18 and a periodic array of holes 19. Instead of the periodic array of holes 19, a periodic array of rods may be formed by executing the dry etching step for a longer time.

FIGS. 6A to 6F diagrammatically show a method for manufacturing an integrated optical circuit according to a third embodiment of the invention. For the purpose of simplification, the method illustrated in FIGS. 6A to 6F is directed to the manufacture of a waveguide surrounded by an array structure. However, optical devices other than waveguides may be produced by the method according to this third embodiment.

The method according to this third embodiment differs from the first embodiment notably in that the second mask, corresponding to the optical structure, is formed prior to the formation of the first mask, corresponding to the optical waveguide. Furthermore, the second mask is made of metal, whereas the first mask is made of a photoresist material.

Figure 6A:
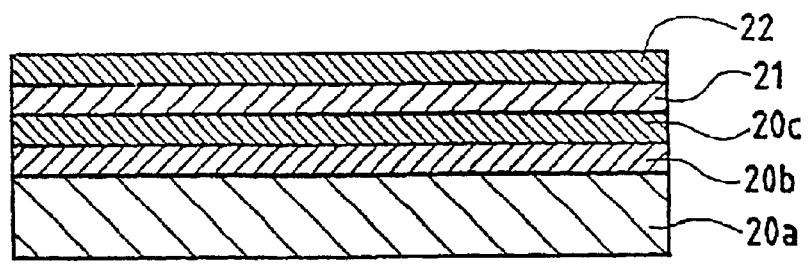
FIGS. 6A to 6F are section views diagrammatically showing a method for manufacturing an integrated optical circuit according to a third embodiment of the present invention.
Figure 6B:
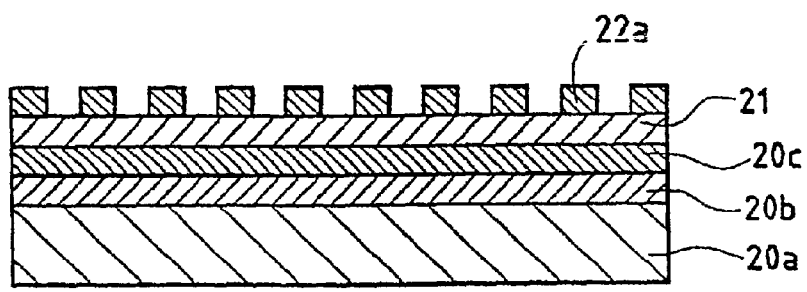
Figure 6C:
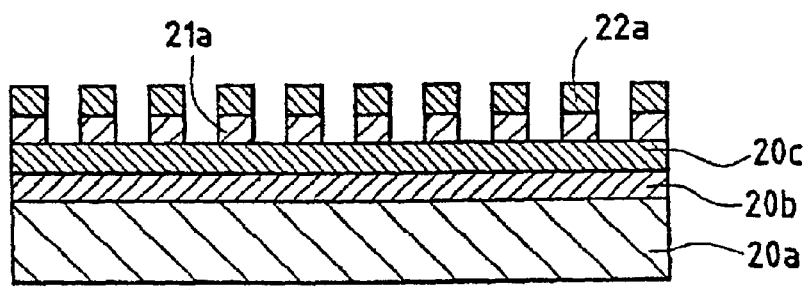
Figure 6D:
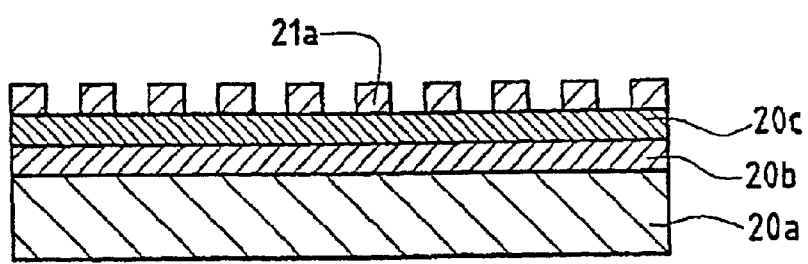

More specifically, the second mask, denoted by reference numeral 21a, is formed by depositing a metal layer 21 on a SOI substrate 20 (FIG. 6A), depositing a photoresist layer 22 on the metal layer 21, patterning the photoresist layer 22 using an interference lithography technique so as to define therein a photoresist pattern 22a (FIG. 6B), and wet etching the metal layer 21 through the photoresist pattern 22a (FIG. 6C). The first mask, denoted by reference numeral 23a, is formed after removal of the remaining photoresist pattern 22a (FIG. 6D) by depositing a photoresist layer 23 on the second mask 21a (FIG. 6E), exposing the wafer to UV through a silica mask 24 having a chromium strip 24a, and developing the photoresist 23 so as to define a pattern 23a corresponding to the optical waveguide (FIG. 6F). The etching step for etching the silicon layer 20c of the substrate 20 is identical to that performed in the first and second embodiments.

Figure 6E:
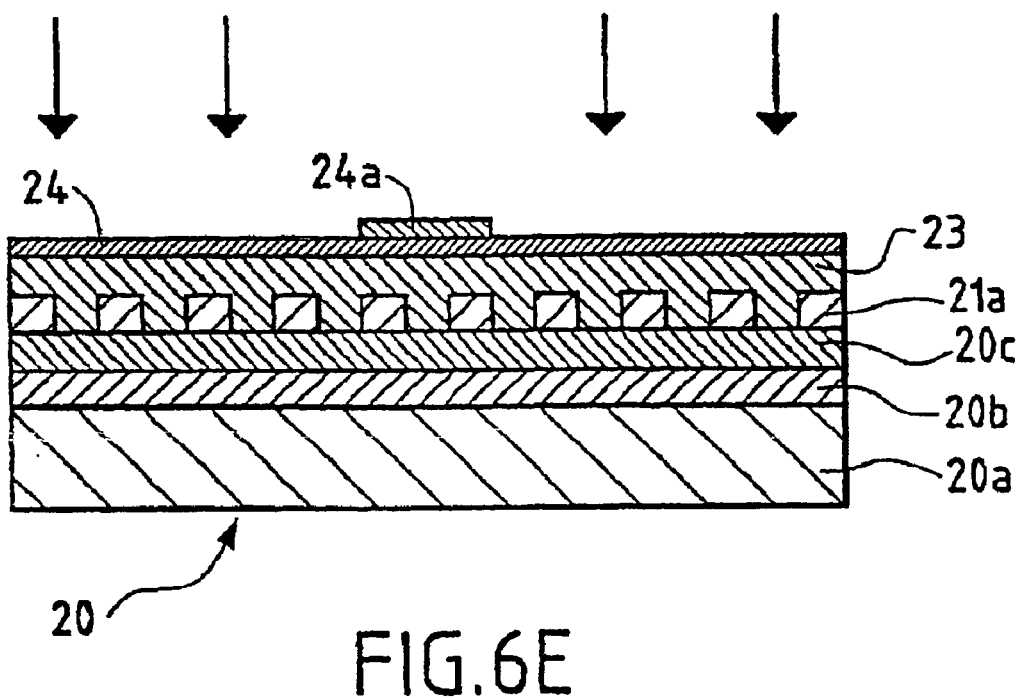
Figure 6F:
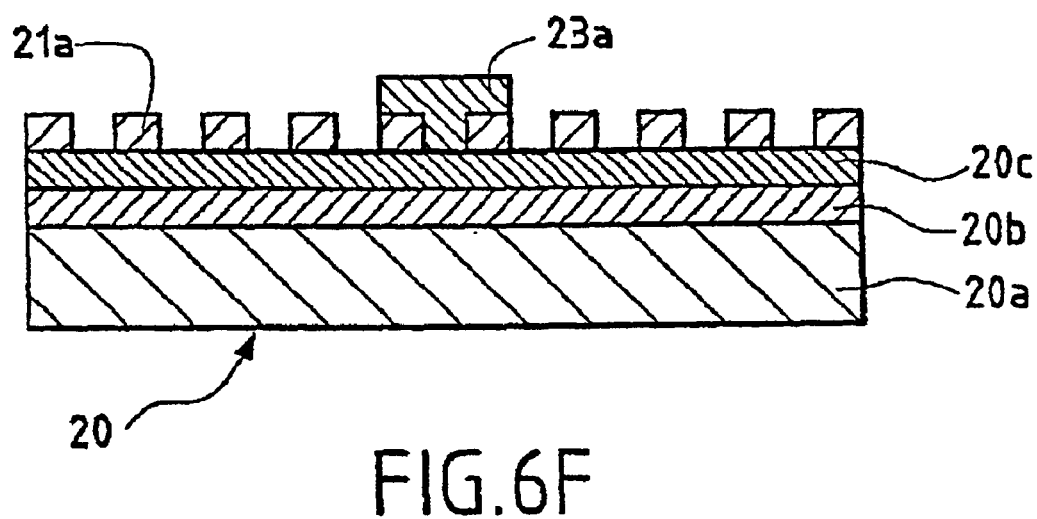

The third embodiment as described above has the advantage that the position of the first mask 23a on the second mask 21a may be accurately selected using the holes of the second mask 21a as references when laying the silica mask 24 on the photoresist layer 23 as shown in FIG. 6E.

The first, second and third embodiments as described above are preferred embodiments for the present invention. However, it will be clearly apparent to the skilled person that the present invention may be carried out differently without departing from the scope of the appended claims. In particular, the SOI substrate used in these embodiments could be replaced, for example, by a substrate composed of a glass base substrate coated with a silicon layer.

Furthermore, the present invention is not limited to the manufacture of integrated optical circuits having a periodic array of holes or rods. The present invention could indeed be used for forming, in a same substrate, optical devices associated with Bragg reflectors. In a general manner, the method according to this invention may be applied when different optical devices or structures are to be formed in a substrate, and is particularly advantageous when the the optical devices or structures exhibit quite different shapes, requiring the use of different patterning techniques for producing the corresponding masks.

What is claimed is:

1. A method for manufacturing an integrated optical circuit on a substrate, the substrate having a first region and a second region distinct from the first region, the method comprising the steps of:

forming a first mask on the substrates the first mask defining a pattern corresponding to at least one optical device to be formed in the first region of the substrate;

forming a second mask on the substrate, the second mask defining a pattern corresponding to an optical structure to be formed in the second region of the substrate; and etching the substrate having simultaneously thereon the first and second masks, in order to form at least one optical device and the optical structure on the substrate;

wherein said etching comprises using a predetermined etching gas, and said first and second masks are made of a material which substantially resists the predetermined etching gas.

2. The method of claim 1 further comprising the step of: removing the first mask and the second mask.

3. The method of claim 1 wherein the step of etching is dry etching using a predetermined etching gas.

4. The method of claim 3 wherein the predetermined etching gas is a fluorine-bearing gas.

5. The method of claim 1 wherein the steps of forming the first mask and the second mask are carried out such that the first mask and the second mask overlay one another.

6. The method of claim 5 wherein the first mask has a first portion which overlays the second mask and a second portion which is in direct contact with the substrate.

7. The method of claim 1 wherein one of the first mask or the second mask is formed using an interference lithography technique and the other of the first mask or the second mask is formed using a UV exposure technique.

8. The method of claim 1 wherein the second mask is formed using an interference lithography technique and radiation, and the first mask is made of a material which is substantially insensitive to the radiation used in the interference lithography technique, so that the second mask may be formed after the formation of the first mask without affecting the first mask.

9. The method of claim 8 wherein the step of forming the second mask comprises the steps of:

forming a photoresist layer on the substrate; and forming a pattern corresponding to the optical structure in the photoresist layer using the interference lithography technique.

10. The method of claim 8 wherein the first mask is made of a metal and the second mask is made of a photoresist material.

11. The method of claim 10 wherein the first mask is made of a metal selected from the group consisting of nickel, chromium, or gold.

12. The method of claim 8 wherein the step of forming the first mask comprises the steps of:

forming a first layer on the substrate, the first layer being made of a material which is substantially insensitive to light;

forming a photoresist layer on the first layer;

patterning the photoresist layer using the UV exposure technique to obtain a photoresist pattern corresponding to the first region of the substrate;

etching the first layer using the photoresist pattern as the first mask; and removing the photoresist pattern.

13. The method of claim 12 wherein the step of etching the first layer is wet etching.

14. The method of claim 8 wherein the first mask and the second mask are both made of a photoresist material, the first mask being a photoresist material which has been heated to remove its sensitivity to light.

15. The method of claim 14 wherein the step of forming the first mask comprises the steps of:

forming a photoresist layer on the substrate;

patterning the photoresist layer using a UV exposure technique to obtain a pattern corresponding to the first region of the substrate; and heating the photoresist pattern to remove its sensitivity to light.

16. The method of claim 1 wherein the first mask is formed using a UV exposure technique and the second mask is made of a material which is substantially insensitive to UV radiation, so that the first mask may be formed after the formation of the second mask without affecting the second mask.

17. The method of claim 1 wherein the substrate is a silicon on insulator substrate.

18. The method of claim 1 wherein the optical structure is an array structure.

19. The method of claim 1 wherein the second region of the substrate is proximate to the first region.

20. The method of claim 19 wherein the array structure consists of a periodic array of irregularities.

21. The method of claim 20 wherein the array structure defines a frequency band gap.

22. The method of claim 20 wherein the array structure is a periodic array of holes.

23. The method of claim 20 wherein the array structure is a periodic array of rods.

24. The method of claim 20 wherein the at least one optical device is a waveguide.

* * * * *